UNITED STATES PATENT OFFICE.

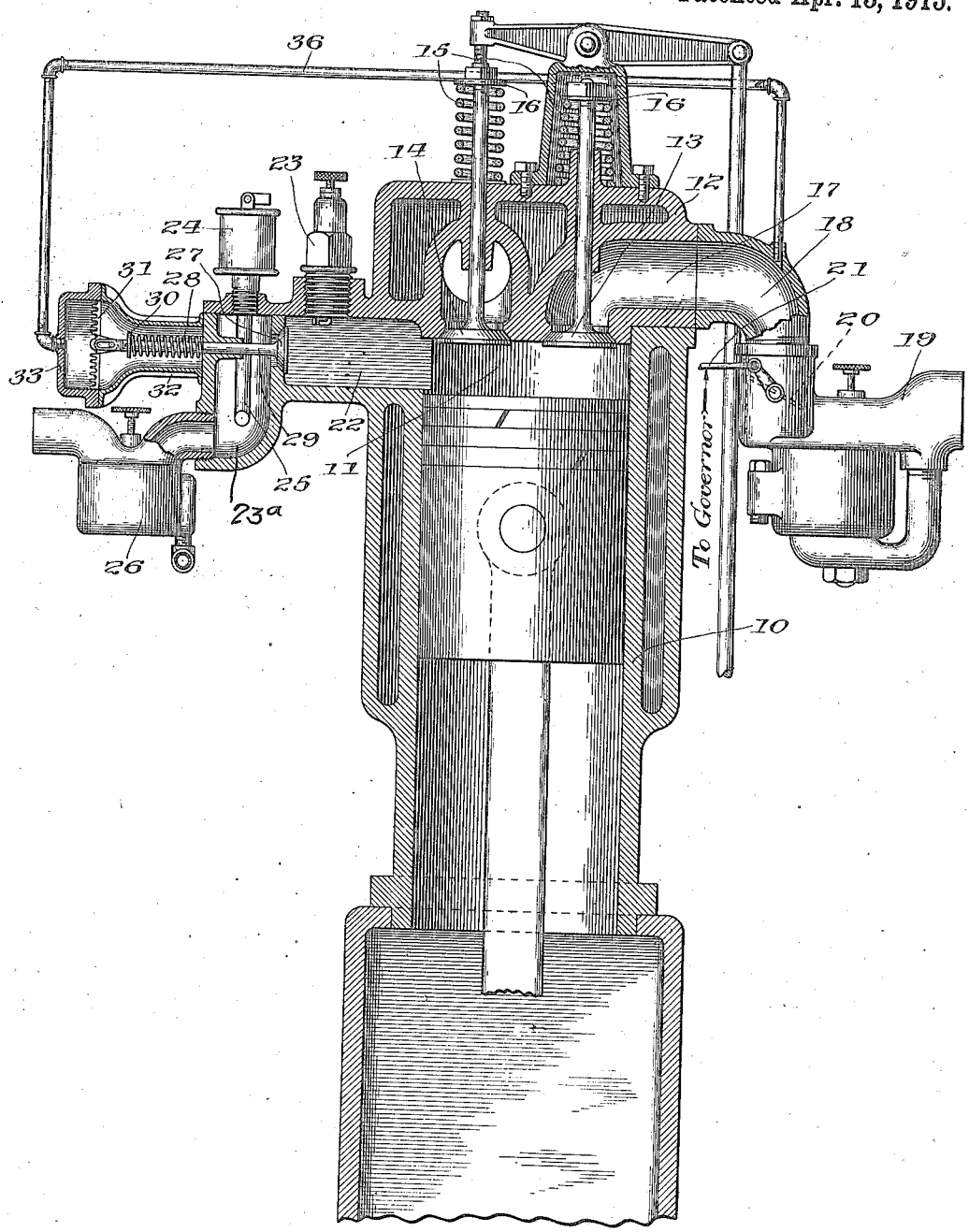

HARRY C. WAITE, OF CHICAGO, ILLINOIS, ASSIGNOR TO INTERNATIONAL HARVESTER CORPORATION, A CORPORATION OF NEW JERSEY.

INTERNAL-COMBUSTION ENGINE.

1,135,083.     Specification of Letters Patent.     Patented Apr. 13, 1915.

Application filed June 8, 1914. Serial No. 843,854.

*To all whom it may concern:*

Be it known that I, HARRY C. WAITE, a citizen of the United States, residing at Chicago, in the county of Cook and State of Illinois, have invented certain new and useful Improvements in Internal-Combustion Engines, of which the following is a full, clear, and exact specification.

This invention relates to internal combustion engines, and more particularly to means for controlling the supply of fuel thereto.

In this application, as in my copending application, Serial No. 843,853, I have disclosed an internal combustion engine adapted to use as fuel the heavier fuel oils, such as kerosene, igniting the main charge of such kerosene in the combustion chamber by igniting an auxiliary charge of fuel in an auxiliary ignition chamber, said auxiliary charge producing a large flash or flame to obtain rapid flame propagation in the combustion chamber of the engine.

The object of this invention is to supply the combustion chamber of an internal combustion engine and the auxiliary ignition chamber with successive charges of fuel, which are at all times so related as to obtain complete combustion of the fuel and to obtain the highest possible efficiency, the engine meeting all of the requirements for successful commercial operation. This object is accomplished by providing in an internal combustion engine, having a combustion chamber and an auxiliary ignition chamber, means for controlling the supply of main charges of fuel to the combustion chamber, and means for controlling the supply of charges of fuel to said auxiliary ignition chamber, said means being so connected and related as to regulate the quantity of fuel in the successive charges to said chambers for producing the most efficient results.

This invention is illustrated on the accompanying sheet of drawings, the single figure being a longitudinal sectional view of an engine embodying my invention.

The various novel features of my invention will be apparent from the description and drawing, and will be particularly set forth in the appended claims.

This internal combustion engine has a cylinder 10, having a combustion chamber 11 and head 12 for said cylinder, in which are located a main inlet valve 13 and exhaust valve 14, each of which is held against its seat by a coiled spring 15, each spring 15 encircling a valve stem of said valves and interposed between the cylinder head 12 and collars 16 secured to said valve stems. In this cylinder head is a main fuel inlet passageway 17 associated with an elbow-shaped conduit 18 interposed between the cylinder head and a carbureter 19. Located in the outlet conduit of the carbureter, or in conduit 18, is a throttle valve 20, which is connected to the engine governor (not shown) by a suitable link 21. Connected to the cylinder of the engine is an auxiliary ignition chamber 22 having a spark plug 23, at the terminals of which sparks are produced for igniting an auxiliary charge of fuel in said auxiliary ignition chamber, which, in turn, ignites the main charge in the combustion chamber in a manner to make rapid flame propagation possible for the complete consumption of the fuel in said combustion chamber. Associated with the auxiliary ignition chamber is a conduit 23$^a$ which may receive a relatively high grade of fuel for starting purposes from any suitable source 24, having a pipe 25 leading into said conduit 23$^a$. Also connected with the conduit 23$^a$ is a carbureter 26, through which a low grade of fuel is supplied to said auxiliary ignition chamber through conduit 23$^a$. Interposed between conduit 23$^a$ and the auxiliary ignition chamber 22 is a valve 27 normally held against its seat by a coiled spring 28 surrounding the stem 29 of the valve and bearing against one wall of the conduit 23$^a$ and a collar 30 secured to the valve stem 29. Operatively connected to the valve stem is a diaphragm 31, said diaphragm and spring being completely inclosed in an air tight receptacle 32, having a cap 33, the body of the receptacle being secured to the engine wall or conduit 23$^a$ in any desired manner.

The main fuel inlet passageway on the engine side of the throttle valve 20, and the air tight receptable 32 are connected by a pipe 36 for transmitting the prevailing fluid pressure in the main fuel inlet passageway therefrom to the air tight conduit 32 on the left-hand side of the diaphragm. When the throttle valve 20 is nearly closed the vacuum caused by the suction of the engine in the passageway 18 is increased, the vacuum extending to the left-hand side of the diaphragm 31 and assisting the coiled spring 28 to hold the valve against its seat, adding more resistance to the passage of fuel from the auxiliary fuel supply means into the auxiliary ignition chamber.

It is seen, therefore, that, through the action of the throttle valve 20, the quantities of fuel mixture passing from the main fuel supply to said combustion chamber and to the auxiliary ignition chamber from the auxiliary fuel supply are at all times related, the latter being controlled by the fluid pressure in the passageway 18, which pressure is transmitted through conduit 36, connecting the main fuel inlet passageway and the air tight receptacle. As the throttle valve 20 in the main fuel supply conduit is opened more and more, permitting a greater quantity of fuel mixture to pass through the conduit 18 into the combustion chamber of the engine, the vacuum in the passageway 18 decreases. This decreasing vacuum which extends through the conduit 36 to the left-hand side of the diaphragm 31 acts to decrease its assistance to the spring 28, thereby permitting the valve 27 to open more readily to permit a greater quantity of auxiliary fuel charge to enter the auxiliary ignition chamber, wherein the auxiliary fuel charge is ignited, producing a large hot flame which flashes into the main combustion chamber of the cylinder for causing the burning of the main charge of fuel therein with great rapidity and completely consuming said charge to obtain the greatest amount of work therefrom. In the same manner, as the throttle valve 20 is moved toward a closed position, the vacuum in passageway 18 and, therefore, on left-hand side of diaphragm 31 is increased, which consequently lends more assistance to the spring 28 against opening the valve 27, thereby preventing such a great quantity of fuel to be supplied to the auxiliary ignition chamber. By means of this arrangement, the throttle valve in the main fuel supply passageway being governor controlled, and the valve 27, past which the auxiliary fuel charges pass into the auxiliary ignition chamber, being controlled in accordance with pressure conditions in the main fuel passageway, and the pressure conditions, corresponding to the operating conditions of the engine, it is seen that the quantities of main and auxiliary fuel charges are at all times related and change in accordance with operating conditions. In this way the engine is controlled in a manner to render the operation thereof extremely efficient to meet the requirements for successful commercial operation.

It is evident that there may be various arrangements and modifications other than that here particularly disclosed, and it is my intention to cover all such arrangements and modifications which do not involve a departure from the spirit and scope of my invention.

What I claim as new is:

1. In an internal combustion engine, a cylinder having a combustion chamber, an auxiliary ignition chamber associated therewith, means through which main charges of fuel to said combustion chamber are supplied, means for supplying auxiliary charges of fuel to said auxiliary ignition chamber, means for igniting the fuel in said auxiliary ignition chamber to ignite the main charge of fuel in said combustion chamber, and means controlled by the pressure in said first mentioned means for controlling the supply to said ignition chamber.

2. In an internal combustion engine, a cylinder having a combustion chamber, an auxiliary ignition chamber associated therewith, means through which main charges of fuel to said combustion chamber are supplied, means for supplying auxiliary charges of fuel to said auxiliary ignition chamber, means for igniting the fuel in said auxiliary ignition chamber to ignite the main charge of fuel in the combustion chamber, means controlled by the pressure in said first mentioned means for controlling the fuel supply to said ignition chamber, and a governor controlled throttle valve for controlling the main fuel supply.

3. In an internal combustion engine, a cylinder having a combustion chamber, an auxiliary ignition chamber, a passageway through which main charges of fuel are passed to said combustion chamber, a pressure actuated valve controlling the supply of fuel to said auxiliary ignition chamber, and means for transmitting the pressure in said passageway to said valve for controlling the quantity of supply to said auxiliary ignition chamber.

4. In an internal combustion engine, the combination of a cylinder having a combustion chamber, an auxiliary ignition chamber associated therewith, main fuel supply means for said combustion chamber, auxiliary fuel supply means for said auxiliary ignition chamber, and a pressure connection associated with said main and auxiliary supply means for controlling the quantity of fuel supply to said auxiliary ignition chamber in accordance with pressure conditions of the main fuel supply.

5. In an internal combustion engine, the combination of a cylinder having a combustion chamber, an auxiliary ignition chamber associated therewith, main fuel supply means for said combustion chamber, auxiliary fuel supply means for said auxiliary ignition chamber, and means whereby the supply from one of said means is controlled by the pressure conditions of fluid supply of the other of said means.

6. In an internal combustion engine, the combination of a cylinder having a combustion chamber, an auxiliary ignition chamber associated therewith, main fuel supply means for said combustion chamber, auxiliary fuel supply means for said auxiliary ignition chamber, a pressure connection associated with said means for controlling the quantity of fuel supply to said auxiliary ignition chamber in accordance with pressure conditions of the main fuel supply, and a governor controlled throttling valve associated with said main fuel supply means.

7. In an internal combustion engine, the combination of a cylinder having a combustion chamber, an auxiliary ignition chamber associated therewith, a valve controlling the passage of fuel into said auxiliary ignition chamber, a diaphragm connected to said valve, a casing in which said diaphragm is located, a main fuel supply passageway through which fuel is supplied to said combustion chamber, a fluid pressure connection between said passageway and said casing for controlling the actuation of said valve in accordance with pressure conditions in said main fuel passageway, and a governor controlled throttle valve in said main fuel passageway.

In testimony whereof I affix my signature, in the presence of two witnesses.

HARRY C. WAITE.

Witnesses:
   CHAS. L. BYRON,
   T. N. DAGGETT.